(12) United States Patent
Ramsl (10) Patent No.: US 11,461,680 B2
(45) Date of Patent: Oct. 4, 2022

(54) IDENTIFYING ATTRIBUTES IN UNSTRUCTURED DATA FILES USING A MACHINE-LEARNING MODEL

(71) Applicant: SAP SE, Walldorf (DE)

(72) Inventor: Hans-Martin Ramsl, Mannheim (DE)

(73) Assignee: SAP SE, Walldorf (DE)

( * ) Notice: Subject to any disclaimer, the term of this patent is extended or adjusted under 35 U.S.C. 154(b) by 329 days.

(21) Appl. No.: 16/880,696

(22) Filed: May 21, 2020

(65) Prior Publication Data
US 2021/0365807 A1 Nov. 25, 2021

(51) Int. Cl.
| | | |
|---|---|---|
| *G06F 15/16* | (2006.01) | |
| *G06N 5/04* | (2006.01) | |
| *G06N 20/00* | (2019.01) | |
| *G06F 16/35* | (2019.01) | |
| *G06V 30/40* | (2022.01) | |
| *G06F 16/30* | (2019.01) | |
| *G06V 30/10* | (2022.01) | |

(52) U.S. Cl.
CPC ............... *G06N 5/04* (2013.01); *G06F 16/30* (2019.01); *G06F 16/35* (2019.01); *G06N 20/00* (2019.01); *G06V 30/40* (2022.01); *G06V 30/10* (2022.01)

(58) Field of Classification Search
None
See application file for complete search history.

(56) References Cited

U.S. PATENT DOCUMENTS

| | | | |
|---|---|---|---|
| 10,860,931 B1 * | 12/2020 | Venter | G06N 5/02 |
| 2018/0204120 A1 * | 7/2018 | Rei | G06N 3/04 |
| 2020/0097597 A1 * | 3/2020 | Lourentzou | G06F 40/211 |
| 2020/0211120 A1 * | 7/2020 | Wang | G06Q 40/08 |
| 2021/0319179 A1 * | 10/2021 | Muffat | G06F 40/30 |

\* cited by examiner

*Primary Examiner* — Alex Gofman
(74) *Attorney, Agent, or Firm* — Sterne, Kessler, Goldstein & Fox P.L.L.C.

(57) ABSTRACT

Provided herein are a system, apparatus, device, method and/or computer program product embodiments, and/or combinations and sub-combinations thereof, for identifying attributes in unstructured data files using a machine-learning model. In an embodiment, a server can receive a request to identify an attribute associated with a set of unstructured data files. The server can extract a first and second subset of features from each unstructured data file of the set of unstructured data files. The server can identify the attribute in the set of unstructured data files request based on each of the first and second subset of features using the machine-learning model.

20 Claims, 10 Drawing Sheets

IDENTIFYING ATTRIBUTES IN UNSTRUCTURED DATA FILES USING A MACHINE-LEARNING MODEL

BACKGROUND

Databases often store unstructured data files. Different unstructured data files can be, for example, scanned images, various levels of quality, and in different file formats. This can make the unstructured data files difficult to parse. Furthermore, it can be difficult to identify specific attributes about the unstructured data files without manually analyzing each file. This can be a time-consuming and error-prone task.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are a system, apparatus, device, method and/or computer program product embodiments, and/or combinations and sub-combinations thereof, for identifying attributes in unstructured data files using a machine-learning model.

In an embodiment, a server can receive a request to identify an attribute associated with a set of unstructured data files. The server can extract a first and second subset of features from each unstructured data file of the set of unstructured data files. The server can use the first and second subset of features from each unstructured data file of the set of unstructured data files to train a machine-learning model using. The server can generate a word embedding for each unstructured data file in the set of unstructured data files based on the first subset of features of each unstructured data file of the set of unstructured data files, using the machine-learning model. Furthermore, the server can generate a numerical lookup table for each unstructured data file in the set of unstructured data files based on the second subset of features of each unstructured data file of the set of unstructured data files, using the machine-learning model. The server can identify the attribute in the set of unstructured data files request based on each of the word embeddings and numerical lookup tables using the machine-learning model.

This configuration allows for identifying attributes in unstructured data such as contract files using the machine-learning model. For example, unstructured data files can be contracts. Large volumes of contracts can be stored in a database. This configuration provides for the server to processes requests such as sorting the set of contract files based on a value of an identified attribute, identifying a subset of contract files of the set of contract files based on an identified attribute, grouping the set of contract files into different groups based on the identified, or identifying a quantitative or qualitative feature about the set of contracts based on the identified attribute. In this regard, this configuration solves the technical problem (among other technical problems) of providing order to unstructured data files and understanding the data in the unstructured data files.

Figure 1:
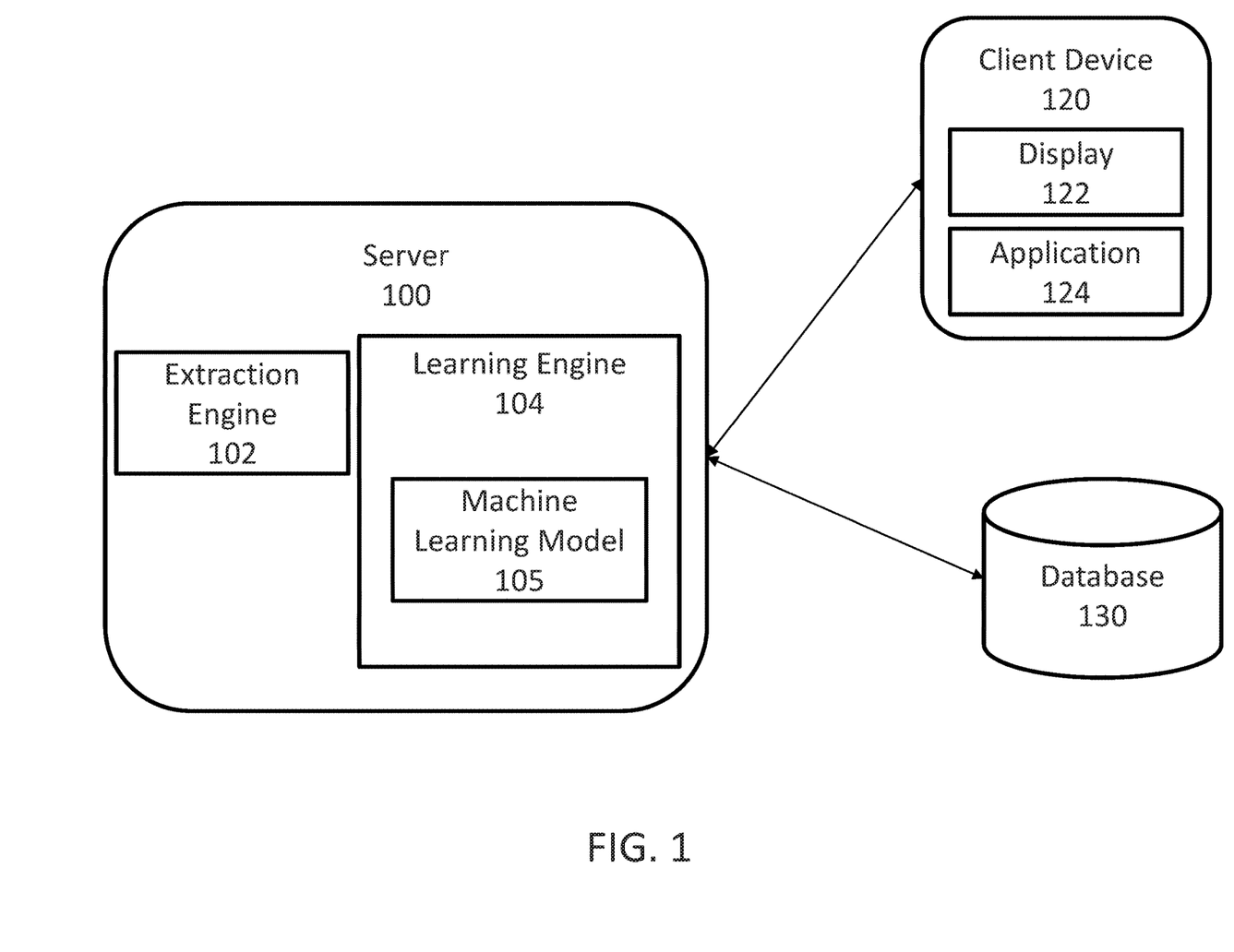
FIG. 1 is a block diagram of an architecture for identifying attributes in unstructured data files using a machine-learning model, according to some embodiments.

FIG. 1 is a block diagram of an architecture for identifying attributes in unstructured data files using a machine-learning model, according to some embodiments. In an embodiment, the architecture can include a server 100, client device 120, and database 130. Server 100 can be in communication with client device 120, and database 130. Server 100, client device 120, and database 130 can be connected through wired connections, wireless connections, or a combination of wired and wireless connections.

As an example, server 100, client device 120, and database 130 can be connected through a network. The network can be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

Server 100 can include an extraction engine 102 and a learning engine 104. The learning engine 104 can implement a machine-learning model 105. The machine-learning model 105 can use implicit and explicit learning algorithms to identify attributes in unstructured data. In this regard, the machine-learning model 105 can be a mixed-machine-learning model. As an example, the machine-learning model 105 can be trained using word embeddings (implicit learning algorithm) and a numerical lookup table (explicit algorithm). An implicit learning algorithm is a method of learning complex information based on the context of particular information as well as previously learned information.

The machine-learning model 105 is continuously trained to build a vocabulary using word embeddings. This way, the machine-learning model 105 is able to identify semantically and logically related words for a given word.

The client device 120 can include a display 122 and an application 124. The application 124 can be an executable application executing on the client device 120. The client device 120 can interface with the server 100 using the application 124. The application 124 can also interface with the display 122 to render information. The client device 120 can interface with the database 130 via the server 100. The database 130 can be allocated on one or more data storage devices configured to store data such as unstructured data files.

In an embodiment, server 100 can receive and store unstructured data files in the database 130. The unstructured data files can be a scanned image file. The scanned image document can include hand-written text, typed text, images, or the like. The server 100 can receive a request to identify an attribute from a set of unstructured data files from the application 124 executing on the client device 120. The extraction engine 102 can execute an optical character recognition algorithm to convert the alphanumeric text in each of the set of unstructured data files into machine-encoded text.

The extraction engine 102 can extract a first and second subset of features from the converted machine-encoded text. The first subset of features for each unstructured data file can include text from the respective unstructured data file. The second subset of features for each unstructured data file can include numerical values from the respective unstructured data file. The server 100 can train the machine-learning model 105 using the first and second subset of features from each unstructured data file of the set of unstructured data files.

The machine-learning model 105 can generate a word embedding for each unstructured data file based on the first subset of features of each unstructured data file. In some embodiments, a word embedding is a learned representation for text where words that have the same meaning have a similar representation. In particular, word embeddings are numerical representations of contextual similarities between words. A word embedding model is an implicit learning model.

In this case, the word embedding model can be a skip-gram model. The skip-gram model is an unsupervised machine-learning algorithm. The skip-gram model can understand lexical ambiguities and represent several meanings for a given word. For example, the word "break" can have multiple representations. One representation can be a verb (to break) to destroy something while another representation can be a noun (e.g., a pause). The skip-gram model can understand the context of the word "break" based on the other words in the sentence. Each word in a group of words (e.g., sentence, paragraph, phrase, or the like) can be represented as a vector. Word vectors that are close together indicate that they are closely related.

The machine-learning model 105 can be continuously trained using the first subset of features of unstructured data files. The machine-learning model 105 can build a vocabulary based on continuous training. For example, the machine-learning model 105 can receive a first subset of features for a given unstructured data file. The first subset of features can include groups of words. The machine-learning model 105 can identify a given word in a group of words and generate a probability for every word in the vocabulary for being a word within a predetermined amount of words to the given word or closely related semantically or logically. This allows the machine-learning model 105 to identify words that are often grouped together. Based on this, the machine-learning model 105 determines the given word's definition and application based on the words that often surround the word.

The machine-learning model 105 can generate a numerical lookup table for each unstructured data file on the second subset of features of each unstructured data file. The machine-learning model 105 can identify the attribute in the set of unstructured data files request based on each of the word embeddings and numerical lookup tables using the machine-learning model. The numerical lookup table can be a form of explicit indexing.

In the event, the attribute is associated with the text of the set of unstructured data files, the machine-learning model 105 can combine the word embeddings of each of the unstructured data files to identify the attribute. Alternatively, in the event the attribute is associated with a numerical value of the set of unstructured data files, the machine-learning model 105 can use the numerical value tables of each of the unstructured data files to identify the attribute. In another example, the attribute can be associated with both the text and numerical values of the set of unstructured data files. In this regard, the machine-learning model 105 can combine each word embedding of the unstructured data files and use the numerical value tables of each unstructured data file to identify the attribute.

As a non-limiting example, the unstructured data files can be contract files. The identified attribute can be, the value of the contract, expiration date, terms, offerer, offeree, or the like. In this regard, the request can be one or more of: sorting the set of contract files based on a value of an identified attribute, identifying a subset of contract files of the set of contract files based on an identified attribute, grouping the set of contract files into different groups based the identified, or identifying a quantitative or qualitative feature about the set of contracts based on the identified attribute.

The machine-learning model 105 can generate a response to the request, such as a sorted list of contracts based on the expiration date, a sorted list of contracts based on value, a sorted list of contracts with the same offeree, a sorted list of contracts with the same offerer, a graph of a set of contracts between the same entities depicting the volume of contracts between the entities, to name just some examples.

In some embodiments, the learning engine 104 can identify qualitative attributes, quantitative attributes, or both associated with the set of unstructured data files. For example, quantitative attributes can be monetary amounts, length of the contract, or the like. The qualitative attribute can include attributes such as whether a contract is lucrative given the limitations provided by the terms of a contract. As an example, the machine-learning model 105 can determine that a given contract is no longer lucrative compared to other contracts by identifying its consideration, term, and expiration date of the given contract and other contracts. In this regard, the machine-learning model 105 can generate a recommendation advising a user not to renew a contract based on determining that the contract is no longer lucrative. The recommendation can be included in the response.

The learning engine 104 can transmit the response to the application 124. The application 124 can render the response on the display 122.

Figure 2:
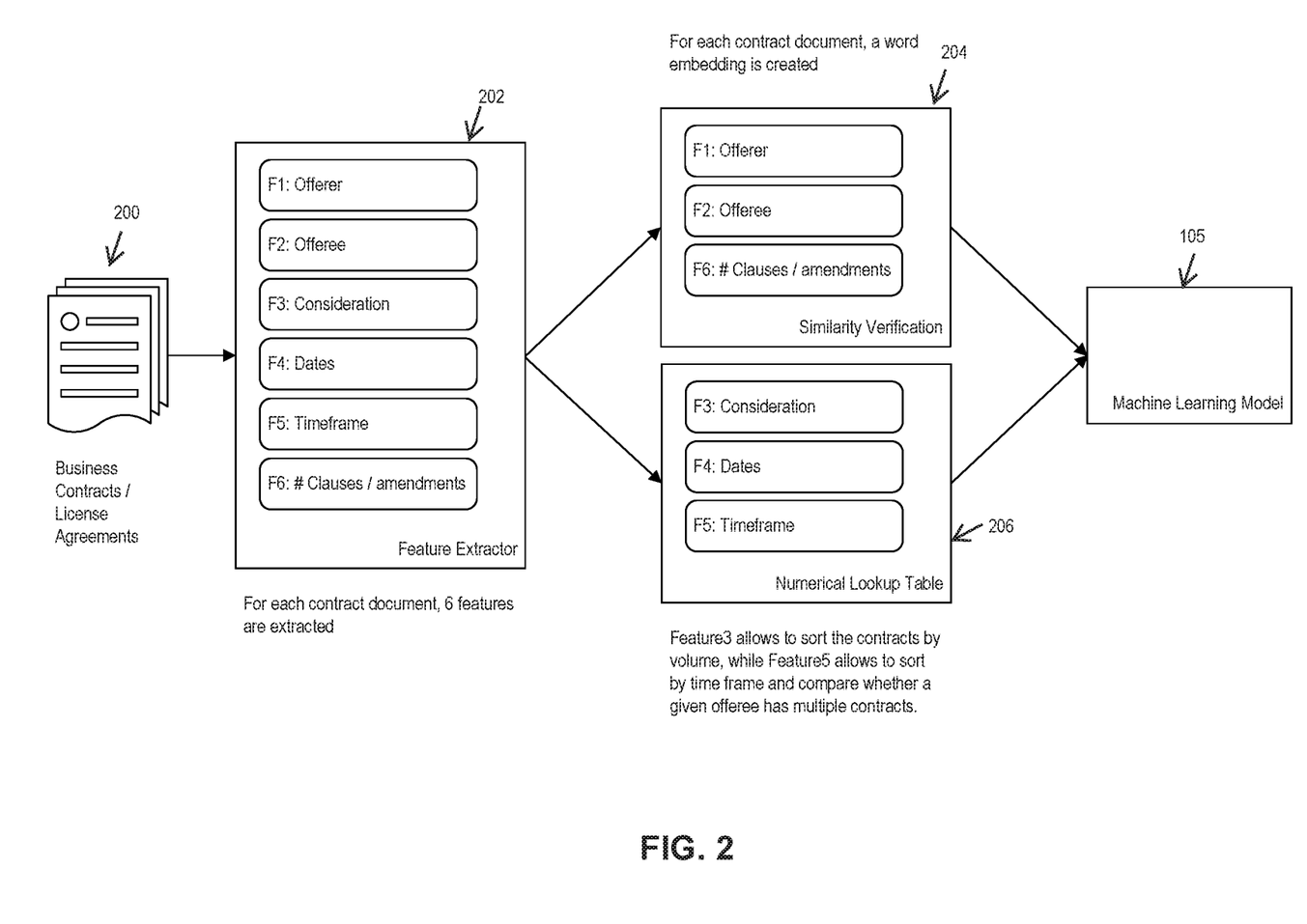
FIG. 2 is a block diagram of extracted features from a set of contract files, according to some embodiments.

FIG. 2 is a block diagram of extracted features from a set of contract files, according to some embodiments. In an embodiment, the set of unstructured data files can be a set of contracts 200. The contracts 200 can include business contracts, license agreements, or the like. The contracts can be an agreement between two or more entities. In particular, a contract can include an offerer, an offeree, consideration, dates, timeframe, and clauses/amendments. It can be appreciated that a contract can include additional or fewer features.

An extraction engine (e.g., extraction engine 102 as shown in FIG. 1) can extract features 202 for each contract from the set of contracts 200. The features 202 can include offerer, an offeree, consideration, dates, timeframe, and a number of clauses/amendments. The features, offerer, offeree, and number of clauses/amendments can be extracted text of each of the set of contracts 200. The features dates, timeframe, and consideration can be extracted as numerical values of the set of contracts 200.

The extraction engine can split the extracted features 202 into a first subset of features 204 and a second subset of features 206. The first subset of features 204 can be offerer, offeree, and the number of clauses/amendments. The second subset of features 206 can be the timeframe, dates, and consideration can be extracted numerical values.

The first subset of features 204 and the second subset of features 206 can be used to train the machine-learning model 105 to identify attributes in unstructured data files such as the set of contracts 200. The machine-learning model 105 can reside in a learning engine (e.g., learning engine 104).

The machine-learning model 105 (e.g., machine-learning model) can implement implicit and explicit learning algorithms to identify attributes associated with the set of contracts 200. The implicit learning algorithm can be word embeddings and the explicit learning algorithm can be numerical lookup tables. In light of this, the machine-learning model 105 can be a mixed machine-learning model.

The machine-learning model 105 can generate word embeddings for the first subset of features 204 for each contract of the set contracts. As described above, a word embedding is a learned representation for text where words that have the same meaning have a similar representation. In this regard, the machine-learning model 105 can identify the details of the offerer, offeree, and the number of clauses/amendments of a given contract using the word embedding of the given contract. For example, the machine-learning model 105 can identify the offeree's name from a given contract using the word embedding of the given contract.

As an example, the first subset of features 206 can include groups of words. The groups of words can include the following sentence "Company1 grants a license of software to Company2." "Company1" can be the first word, "grants" can be the second word, "license" can be the third word, "software" can be the fourth word, and "Company2" can be the fifth word. Each word can constitute as a node for an input layer. The machine-learning model 105 can identify the word "license" from this sentence as the target word (or input word). The machine-learning model 105 can identify the k nearest words to "license" where k is equal to 3. In this example, k can be the nearest words in the sentence or k semantically or logically related words in the vocabulary.

The nodes of the input layer can be input into a hidden layer. The hidden layer can identify weights for the different nodes. The machine-learning model 105 can output permutations of the different combinations of k can be the nearest words in the sentence or k semantically or logically related words in the vocabulary to "license".

The machine-learning model 105 can output the three most likely words to appear before or after the word "license". In this example, the machine-learning model 105 can determine that the word "license" is usually surrounded by words that have a semantic meaning comparable to the meaning of the word "grant", i.e. synonyms of "grant", such as allow, concede, accept or recognize and names of companies (e.g., Company1 and Company2). Based on this, the machine-learning model 105 can determine a license is being granted from Company1 to Company2 and so Company1 is the licensor (or offerer) while Company2 is the licensee (or offeree).

The machine-learning model 105 can generate a numerical lookup table for the second subset of features 206 for each contract of the set of contracts. In this regard, the machine-learning model 105 can identify details of the timeframe, dates, and consideration based on the numerical lookup table of a given contract. For example, the machine-learning model 105 can determine an expiration date of a given contract using the date and time frame of the given contract. In the event, the date of the contract was executed was Jan. 1, 2020, and the timeframe of the given contract is 12 months. In light of this, the machine-learning model 105 can determine the expiration date of the given contract is Jan. 1, 2021.

Figure 3:
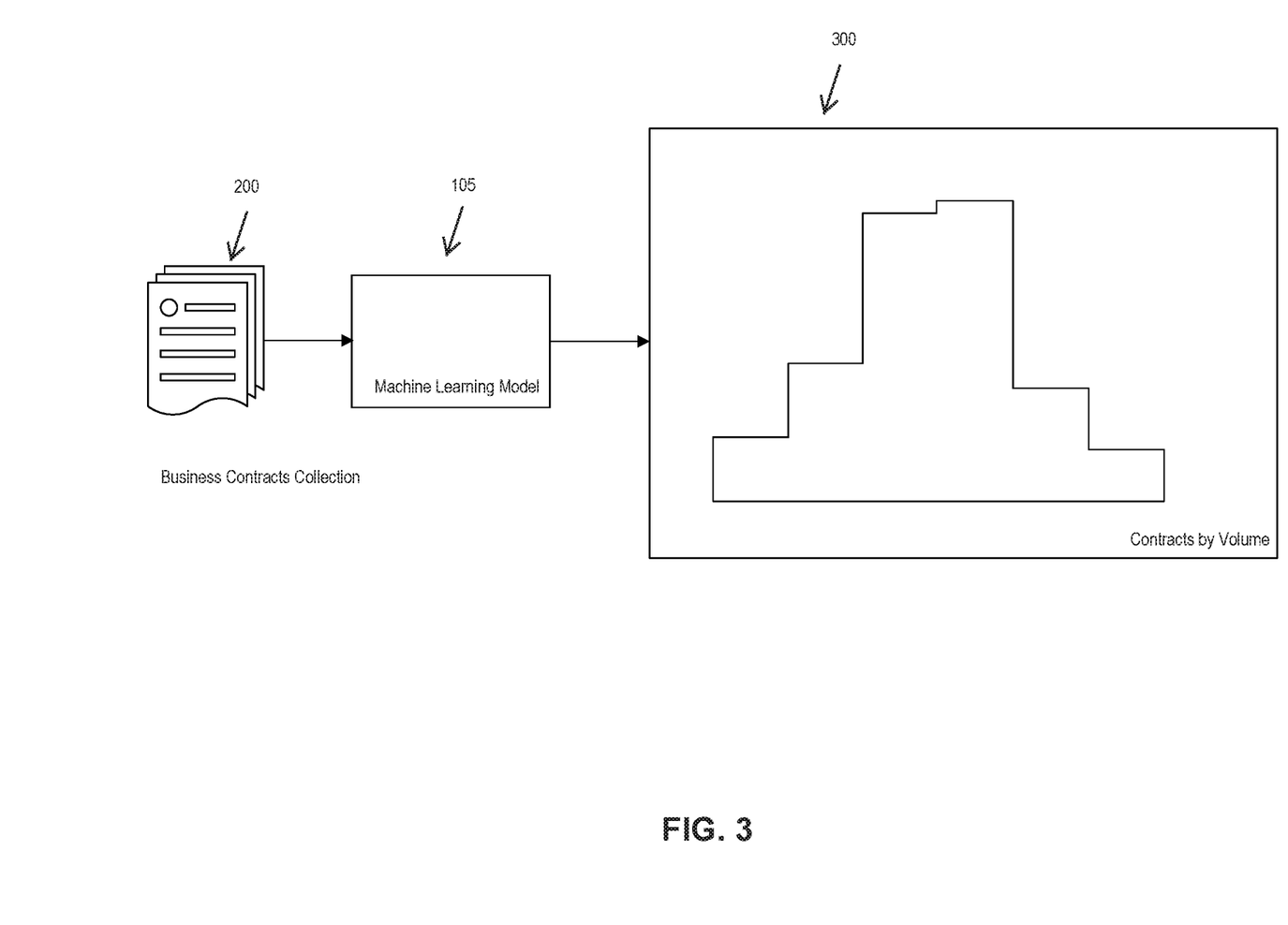
FIG. 3 is a block diagram of a graph depicting contracts by volume, according to some embodiments.

FIG. 3 is a block diagram of a graph depicting contracts by volume, according to some embodiments. In an embodiment, a user can transmit a request to generate a graph based on the volume of the set of contracts 200 using an application (e.g., application 124 as shown in FIG. 1) executing on the client device (e.g., client device 120 as shown in FIG. 1). The volume can be in terms of the value of the contracts. The value can be the consideration or monetary value of the contract based on the terms of the contract. As described above, the machine-learning model 105 can be trained using the first and second subset of features (e.g., first and second subset of features 204, 206) to identify an attribute associated with the set of contracts 200. In this example, the attribute can be the volume of the contracts per offeree or offerer. Furthermore, the machine-learning model 105 can generate a word embedding based on the first subset of features for each contract of the set of contracts 200 and a numerical lookup table based on the second subset of features for each contract of the set of contracts 200.

The machine-learning model 105 can combine each word embedding for each contract of the set of contracts 200 to identify the offerer and offeree of each contract. The machine-learning model 105 can use the numerical lookup table of each contract to identify the consideration of each contract. The machine-learning model 105 can sort the set of contracts based on the value of the contracts. The machine-learning model 105 can generate a graph 300 using the values of the contracts and the offerees or offerers of the contracts. In one example, the x-axis of the graph 300 can represent the different offerees and the y-axis of the graph 300 can represent the value of the contracts per respective offeree. In another example, the x-axis of the graph 300 can represent the different offerers and the y-axis of the graph 300 can represent the value of the contracts per respective offerer.

In one example, the graph 300 can depict a combined value of each contract of each respective offerer or offeree. In this example, the machine-learning model 105 can combine the total consideration for each respective contract for a given offeree or offerer. Alternatively, the graph 300 can depict the value of each contract for each respective offerer or offeree.

The graph 300 can allow a user to identify the offerers or offerees with the contracts of the highest value in terms of consideration. The graph 300 can be transmitted to the client device and rendered on the display (e.g., display 122 as shown in FIG. 1) using the application.

In one example, the volume can be the number of contracts per offerer or offeree. In this example, the x-axis of the graph 300 can represent the different offerees and the y-axis of the graph 300 can represent the number of contracts per respective offeree. In another example, the x-axis of the graph 300 can represent the different offerers and the y-axis of the graph 300 can represent the number of contracts per respective offerer.

Figure 4:
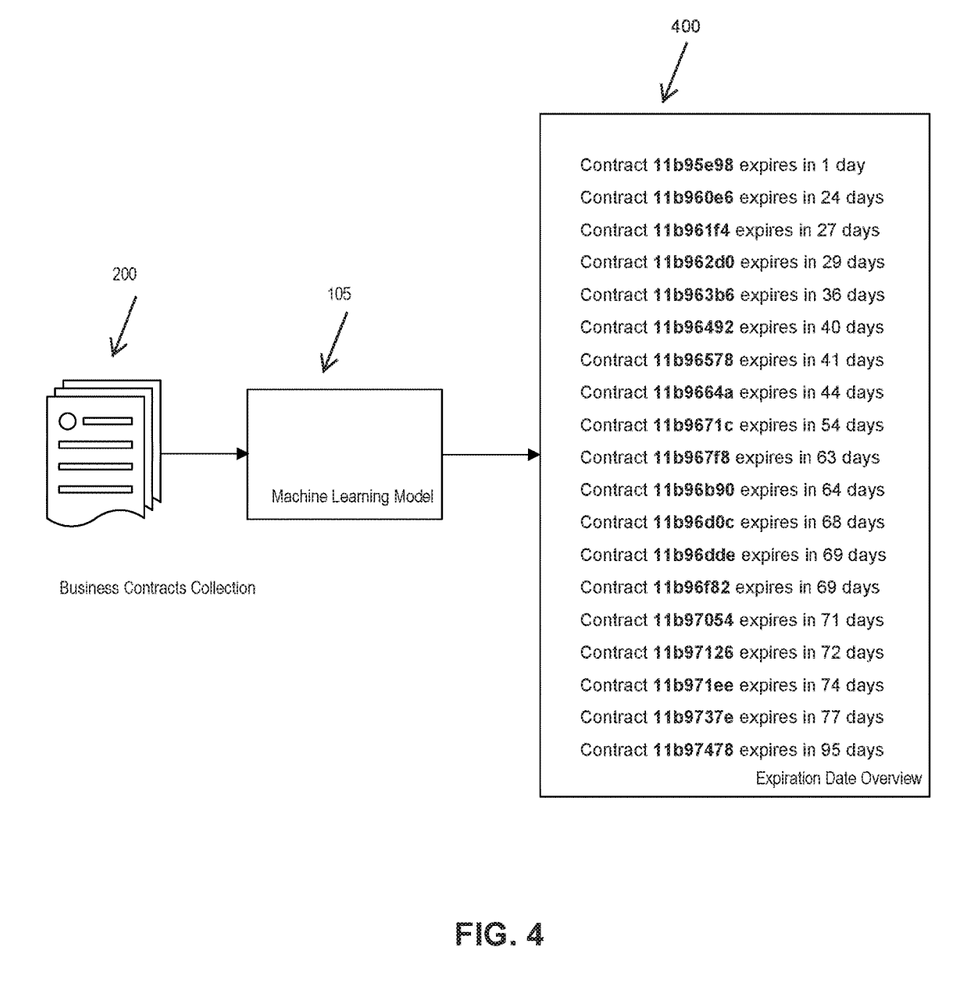
FIG. 4 is a block diagram of a generated list of contracts sorted by expiration date, according to some embodiments.

FIG. 4 is a block diagram of a generated list of contracts sorted by expiration date, according to some embodiments.

In an embodiment, a user can transmit a request to the server for sorting a set of contracts 200 based on a number of days until the expiration date of the contract to a server (e.g., server 100 as shown in FIG. 1) using an application (e.g., application 124) executing on a client device (e.g., client device 120 as shown in FIG. 1). As described above, the machine-learning model 105 can be trained using the first and second subset of features (e.g., the first and second subset of features 204 and 206 as shown in FIG. 2) to identify an attribute in the set of contracts 200. In this example, the attribute can be the number of days until the expiration of the contract.

The machine-learning model 105 can generate a word embedding for each contract of the set of contracts 200 using the first subset of features. The machine-learning model 105 can generate a numerical table lookup for each contract of the set of contracts 200 using the second subset of features.

The machine-learning model 105 can identify the date of execution of each contract and timeframe of each contract from the numerical lookup table of each contract. The machine-learning model 105 can determine the number of days until the expiration of a contract based on the date of execution of the contract, the timeframe of each contract, and the current date. For example, if the contract was executed on Jan. 1, 2020, the current date is Jul. 1, 2020, and the timeframe of the contract is 12 months, the machine-learning model 105 can determine the contract will expire in 184 days (or Jan. 1, 2021).

The machine-learning model 105 can generate a list 400 including the set of contracts 200 sorted based on days until the expiration of each contract. The list 400 can be in ascending or descending order. The list 400 can be transmitted to the client device and rendered on a display (e.g. display 122 as shown in FIG. 1) of the client device using the application.

In an embodiment, the machine-learning model 105 can generate an alert for contracts that are expiring within a given threshold of time. The alert can include the contracts' identifier and the number of days until expiration. The alert can be rendered on the display of the client device using the application.

In an embodiment, the machine-learning model 105 can identify similarities between contracts using the word embedding for each contract of the set of contracts 200. For example, the machine-learning model 105 can identify similarities between the clauses/amendments of each contract of the set of contracts using the word embedding. The machine-learning model 105 can determine the number of clauses and amendments of each contract, the types of clauses and amendments in each contract, the details of the clauses and amendments of each contract, or the like.

The machine-learning model 105 can also identify the consideration of each contract using the numerical lookup table for each contract of the set of contracts 200. Based on the consideration of each contract and similarities between the contracts, the machine-learning model 105 can generate a recommendation on whether to renew a contract that is within a threshold amount of days until expiration. For example, the machine-learning model 105 can determine the benefits of a given contract based on a comparison of the clauses and amendments and consideration of a given contract with the clauses and amendments and consideration other contracts. The recommendation can be transmitted to the client device and rendered on the display using the application.

Figure 5:
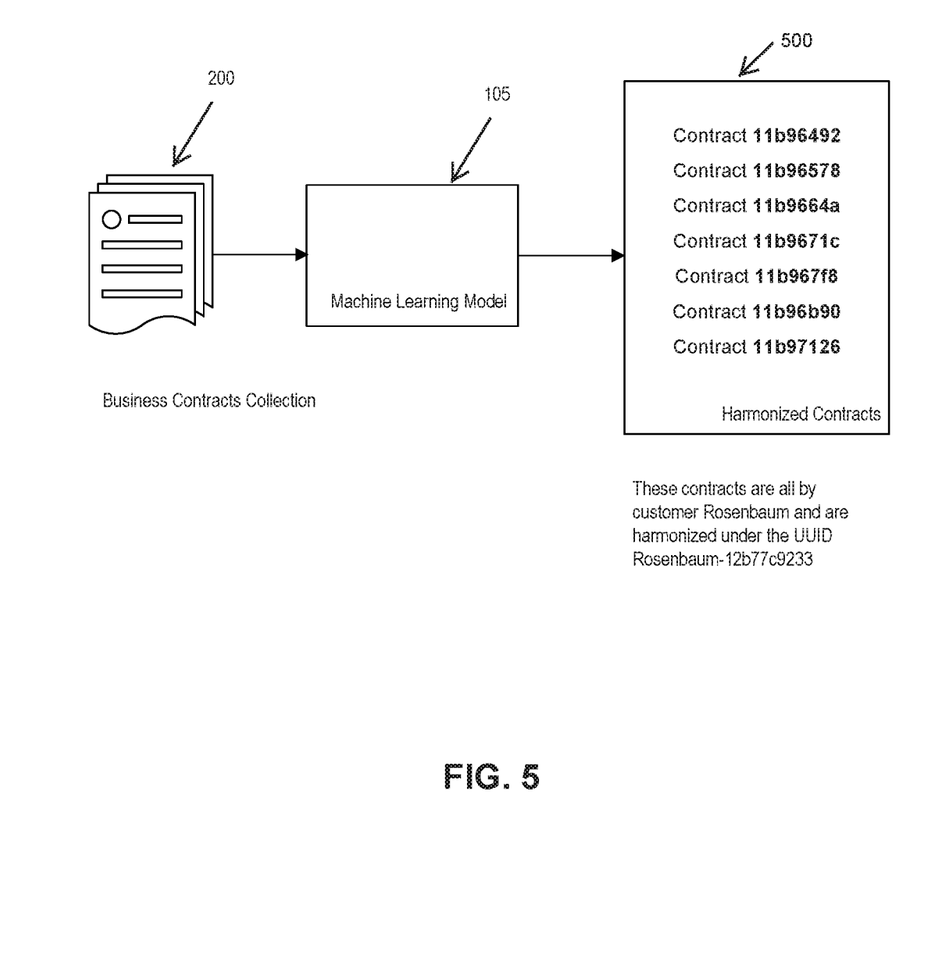
FIG. 5 is a block diagram of a list of harmonized contracts, according to some embodiments.

FIG. 5 is a block diagram of a list of harmonized contracts, according to some embodiments. In one embodiment, a user can transmit a request to the server for harmonizing a subset of contracts of the set of contracts 200 based on an attribute, to a server (e.g., server 100 as shown in FIG. 1) using an application (e.g., application 124) executing on a client device (e.g., client device 120 as shown in FIG. 1). Harmonization is a process of consolidating disparate data records into a single data record based on a similar attribute for quick and easy access from the database. The single data record can be stored in the database (e.g., database 130 as shown in FIG. 1) under a single unique key or identifier.

As described above, the machine-learning model 105 can be trained using the first and second subset of features (e.g., the first and second subset of features 204 and 206 as shown in FIG. 2) to identify an attribute in the set of contracts 200. In this example, the attribute can be an element related to one of the first or second subset of features.

The machine-learning model 105 can generate a word embedding for each contract of the set of contracts 200 using the first subset of features. The machine-learning model 105 can generate a numerical table lookup for each contract of the set of contracts 200 using the second subset of features.

The machine-learning model 105 can use the word embedding or numerical lookup table of each contract of the set of contracts 200 to harmonize a subset of contracts into a single record 500 to be stored in the database. For example, the request can specify harmonizing the subset of contracts based on a single offeree. The machine-learning model 105 can identify all the contracts with the same offeree in the set of contracts 200, using the word embedding of each contract of the set of contracts. The contract identifiers of the identified contracts can be grouped together in a single record 500. The single record 500 can be stored in the database.

The example shown in FIG. 2 includes the single record 500 includes all of the contracts from customer Rosenbaum and are harmonized under the UUID Rosenbaum-12b77c9233. This allows a user to easily access a subset of contracts using the UUID Rosenbaum-12b77c9233.

The machine-learning model 105 can harmonize a subset of contracts based on any element of the features. For example, the machine-learning model 105 can harmonize a subset of contracts based on similar consideration, offerer, timeframe, dates, or clauses/amendments.

Figure 6:
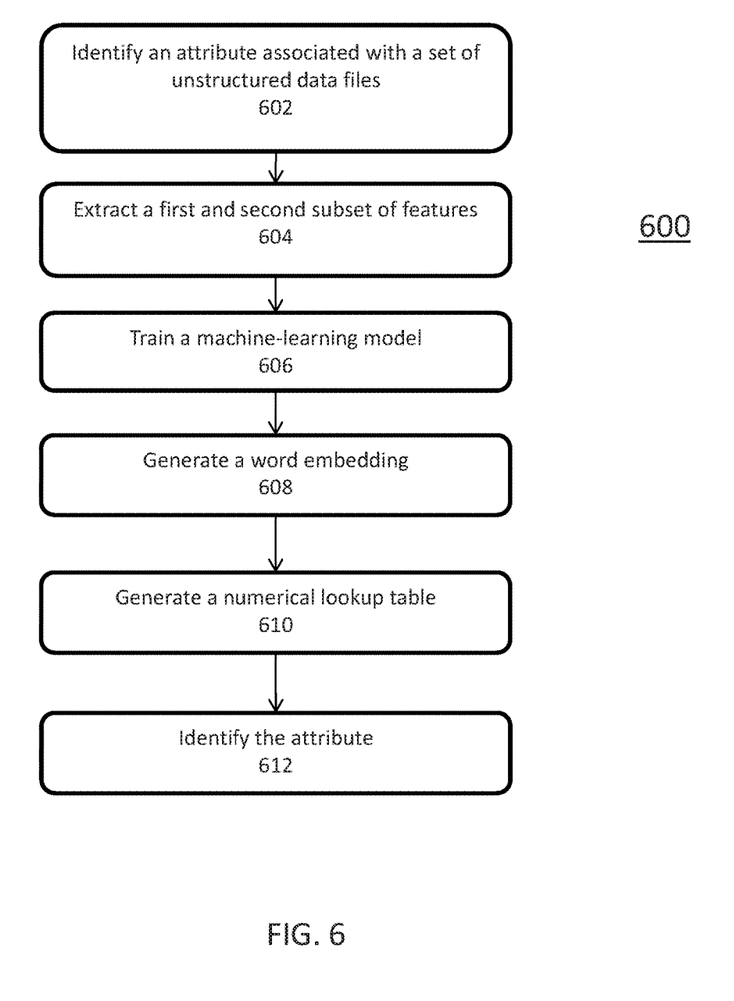
FIG. 6 is a flowchart illustrating a process for identifying an attribute of unstructured data files, according to some embodiments.

FIG. 6 is a flowchart illustrating a process for identifying an attribute associated with a set of unstructured data files, according to an embodiment. Method 600 can be performed by processing logic that can comprise hardware (e.g., circuitry, dedicated logic, programmable logic, microcode, etc.), software (e.g., instructions executing on a processing device), or a combination thereof. It is to be appreciated that not all steps can be needed to perform the disclosure provided herein. Further, some of the steps can be performed simultaneously, or in a different order than shown in FIG. 6, as will be understood by a person of ordinary skill in the art.

Method 600 shall be described with reference to FIG. 1. However, method 600 is not limited to that example embodiment.

In 602, server 100 receives a request to identify an attribute associated with a set of unstructured data files. The unstructured data files can be a scanned image. The unstructured data files can include alphanumeric text and images. The extraction engine 102 can execute an OCR algorithm on the set of unstructured data files to convert the alphanumeric text into machine-encoded text.

In 604, the extraction engine 102 extracts a first and second subset of features from each unstructured data files of the set of unstructured data files. The first subset of features can include text from each respective unstructured data file. The second subset of features can include numerical values from each respective unstructured data file.

In 606, server 100 trains a machine-learning model 105 using the first and second subset of features from each unstructured data file of the set of unstructured data files. The learning engine 104 can implement the machine-learning model 105 to identify the attribute from the set of unstructured data files.

In 608, the machine-learning model 105 generates a word embedding for each unstructured data file in the set of unstructured data files based on the first subset of features of each unstructured data file of the set of unstructured data files, using the machine-learning model. A word embedding is a learned representation for text where words that have the same meaning have a similar representation.

In 610, the machine-learning model 105 generates a numerical lookup table for each unstructured data file in the set of unstructured data files based on the second subset of features of each unstructured data file of the set of unstructured data files, using the machine-learning model. As described above, the second subset of features includes numerical values. The numerical lookup table includes the numerical values from the second subset of features.

In 612, the machine-learning model 105 identifies the attribute in the set of unstructured data files request based on each of the word embeddings and numerical lookup tables using the machine-learning model 105. The machine-learning model can use implicit and explicit learning algorithms to identify the attribute. The word embeddings can be used for the implicit algorithm and the numerical lookup table can be used for the explicit algorithm.

Figure 7:
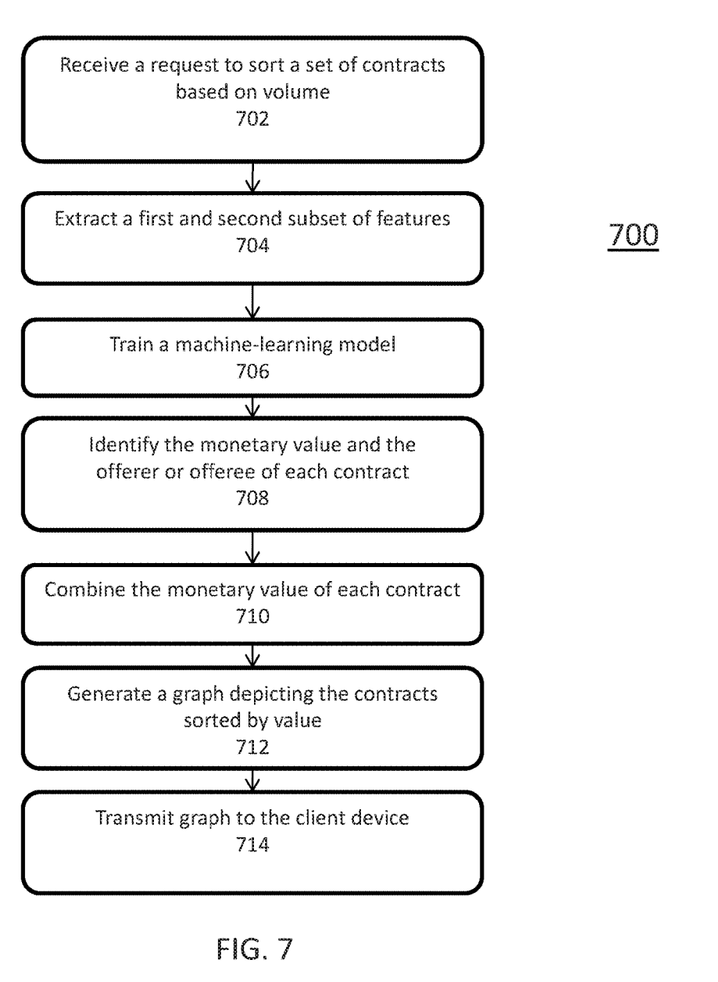
FIG. 7 is a flowchart illustrating a process for identifying an attribute of unstructured data files associated with a first subset of features, according to some embodiments.

FIG. 7 is a flowchart illustrating a process storing contract files based on volume. Method 700 can be performed by processing logic that can comprise hardware (e.g., circuitry, dedicated logic, programmable logic, microcode, etc.), software (e.g., instructions executing on a processing device), or a combination thereof. It is to be appreciated that not all steps can be needed to perform the disclosure provided herein. Further, some of the steps can be performed simultaneously, or in a different order than shown in FIG. 7, as will be understood by a person of ordinary skill in the art.

Method 700 shall be described with reference to FIG. 1. However, method 700 is not limited to that example embodiment.

In 702, server 100 can receive a request to sort a set of contracts based on volume from the application 124 executing on the client device 120. The volume can correspond with the combined monetary value of contracts per offerer or offeree. The set of contract files can be unstructured data files. The extraction engine 102 can execute an OCR algorithm to convert the alphanumeric text of the document into machine-encoded text.

In 704, the extraction engine 102 extracts a first subset of features and a second subset of features for each contract of the set of contracts. The first subset of features can include the offerer, offeree, and clauses/amendments of each respective contract. The second subset of features can include the consideration, date, and timeframe of each respective contract.

In 706, server 100 trains a machine-learning model 105 using the first and second subset of features from each contract of the set of contracts. The learning engine 104 can implement the machine-learning model 105 to identify the attribute from the set of unstructured data files.

In 708, the machine-learning model 105 identifies the monetary value (e.g., consideration) of each contract and the offerer or offeree of each contract. The machine-learning model 105 can generate a word embedding for each contract in the set of contracts based on the first subset of features of each unstructured data file of the set of unstructured data files, using the machine-learning model 105. The machine-learning model 105 can identify the offerer or offeree of each contract using each word embedding for each contract. The machine-learning model 105 can generate a numerical lookup table for each contract of the set of contracts using the second subset of features for each contract. The machine-learning model 105 can identify the consideration of each contract based on the numerical lookup table for each contract. The machine-learning model 105 can determine the monetary value of each contract based on the identified consideration.

In 710, the machine-learning model 105 combines the monetary value of each contract for the same offerer or offeree. The machine-learning model 105 can group the contracts based on the same offeree or offerer. The machine-learning model 105 can then add the monetary value of the contracts for each contract with the same offerer or offeree.

In 712, the machine-learning model 105 generates a graph depicting the contracts sorted by value. The x-axis of the graph can represent the offerer or offeree. The y-axis of the graph can represent the combined monetary value of each contract with the same offerer or offeree.

In 714, the server 100 transmits the graph to the client device 120. The application 124 of the client device 120 can render the graph on the display 122 of the client device 120.

Figure 8:
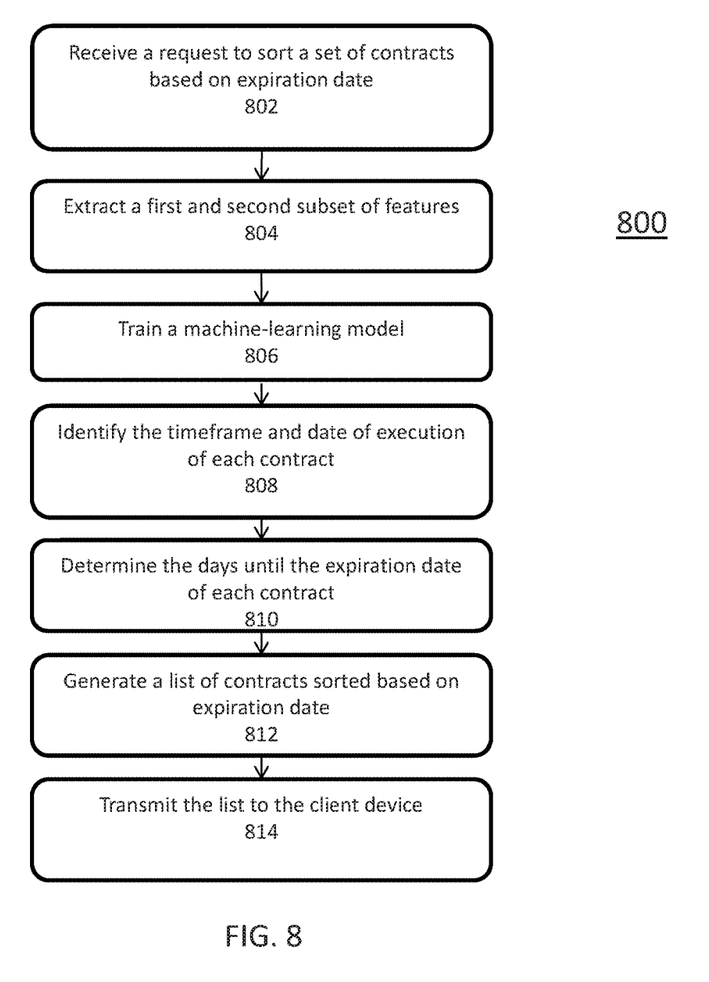
FIG. 8 is a flowchart illustrating a process for identifying an attribute of unstructured data files associated with a second subset of features, according to some embodiments.

FIG. 8 is a flowchart illustrating a process sorting a set of contracts based on an expiration date. Method 800 can be performed by processing logic that can comprise hardware (e.g., circuitry, dedicated logic, programmable logic, microcode, etc.), software (e.g., instructions executing on a processing device), or a combination thereof. It is to be appreciated that not all steps can be needed to perform the disclosure provided herein. Further, some of the steps can be performed simultaneously, or in a different order than shown in FIG. 8, as will be understood by a person of ordinary skill in the art.

Method 800 shall be described with reference to FIG. 8. However, method 800 is not limited to that example embodiment.

In 802, server 100 can receive a request to sort a set of contracts based on days until the expiration date of the contract. The request can also indicate whether to sort the set of contracts in ascending or descending order. The set of contract files can be unstructured data files. The extraction engine 102 can execute an OCR algorithm to convert the alphanumeric text of the document into machine-encoded text.

In 804, the extraction engine 102 extracts a first subset of features and a second subset of features for each contract of the set of contracts. The first subset of features can include the offerer, offeree, and clauses/amendments of each respective contract. The second subset of features can include the consideration, date, and timeframe of each respective contract.

In 806, server 100 trains a machine-learning model 105 using the first and second subset of features from each contract of the set of contracts. The learning engine 104 can implement the machine-learning model 105 to identify the attribute from the set of unstructured data files. The machine-learning model 105 generates a word embedding for each contract in the set of contracts based on the first subset of features of each unstructured data file of the set of unstructured data files, using the machine-learning model.

The machine-learning model 105 generates a numerical lookup table for each contract of the set of contracts using the second subset of features for each contract.

In 808, the machine-learning model 105 identifies the timeframe and date of execution of each contract from the set of contracts from the numerical lookup table. For example, the date of execution can be Jan. 1, 2020, and the timeframe can be 12 months.

In 810, the machine-learning model 105 determines the days until the expiration date of each contract of the set of contracts based on the date and timeframe of each contract and the current date. For example, in the event the current date can be Jul. 1, 2020, the machine-learning model 105 can determine that the days until the expiration date is 184 days.

In 812, the machine-learning model 105 generates a list of contracts sorted based on the expiration date. The list can be sorted in ascending or descending order.

In 816, the server 100 transmits the list to the client device 120. The application 124 of the client device 120 can render the list on the display 122 of the client device 120.

Figure 9:
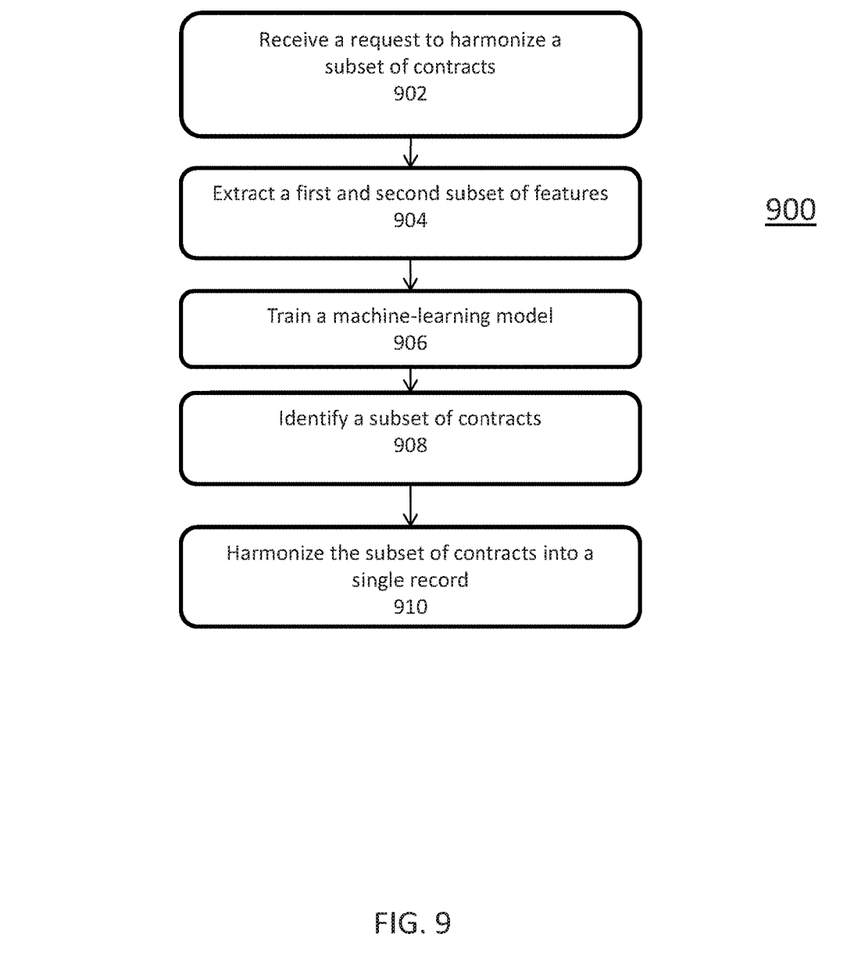
FIG. 9 is a flowchart illustrating a process harmonizing a subset of a set of contracts based on an element of a feature of the subset of contracts.

FIG. 9 is a flowchart illustrating a process harmonizing a subset of a set of contracts based on an element of a feature of the subset of contracts. Method 900 can be performed by processing logic that can comprise hardware (e.g., circuitry, dedicated logic, programmable logic, microcode, etc.), software (e.g., instructions executing on a processing device), or a combination thereof. It is to be appreciated that not all steps can be needed to perform the disclosure provided herein. Further, some of the steps can be performed simultaneously, or in a different order than shown in FIG. 9, as will be understood by a person of ordinary skill in the art.

Method 900 shall be described with reference to FIG. 9. However, method 900 is not limited to that example embodiment.

In 902, server 100 can receive a request to harmonize a subset contracts based on an element of a feature of the subset of the contract. Harmonizing is the process of consolidating disparate records (e.g., records associated for different contracts) into one record based on a similar element. For example, the subset of contracts can be harmonized based on the same offerer, offeree, consideration, timeframe, date, or clause/amendments.

In 904, the extraction engine 102 extracts a first subset of features and a second subset of features for each contract of the set of contracts. The first subset of features can include the offerer, offeree, and clauses/amendments of each respective contract. The second subset of features can include the consideration, date, and timeframe of each respective contract.

In 906, server 100 trains a machine-learning model using the first and second subset of features from each contract of the set of contracts. The learning engine 104 can implement the machine-learning model 105 to identify the attribute from the set of unstructured data files. The machine-learning model 105 generates a word embedding for each contract in the set of contracts based on the first subset of features of each unstructured data file of the set of unstructured data files, using the machine-learning model. The machine-learning model 105 generates a numerical lookup table for each contract of the set of contracts using the second subset of features for each contract.

In 908, the machine-learning model 105 identifies a subset of contracts that share the identified element of a feature from the set of contracts. In the event the element is associated with the first subset of features, the machine-learning model 105 can identify the subset of contracts based on the word embeddings of the subset of contracts. In the event, the element is associated with the second subset of features, the machine-learning model 105 can use the numerical lookup table for each contract.

In 910, the machine-learning model 105 harmonizes the subset of contracts into a single record. The single record can be stored under a unique identifier.

Figure 10:
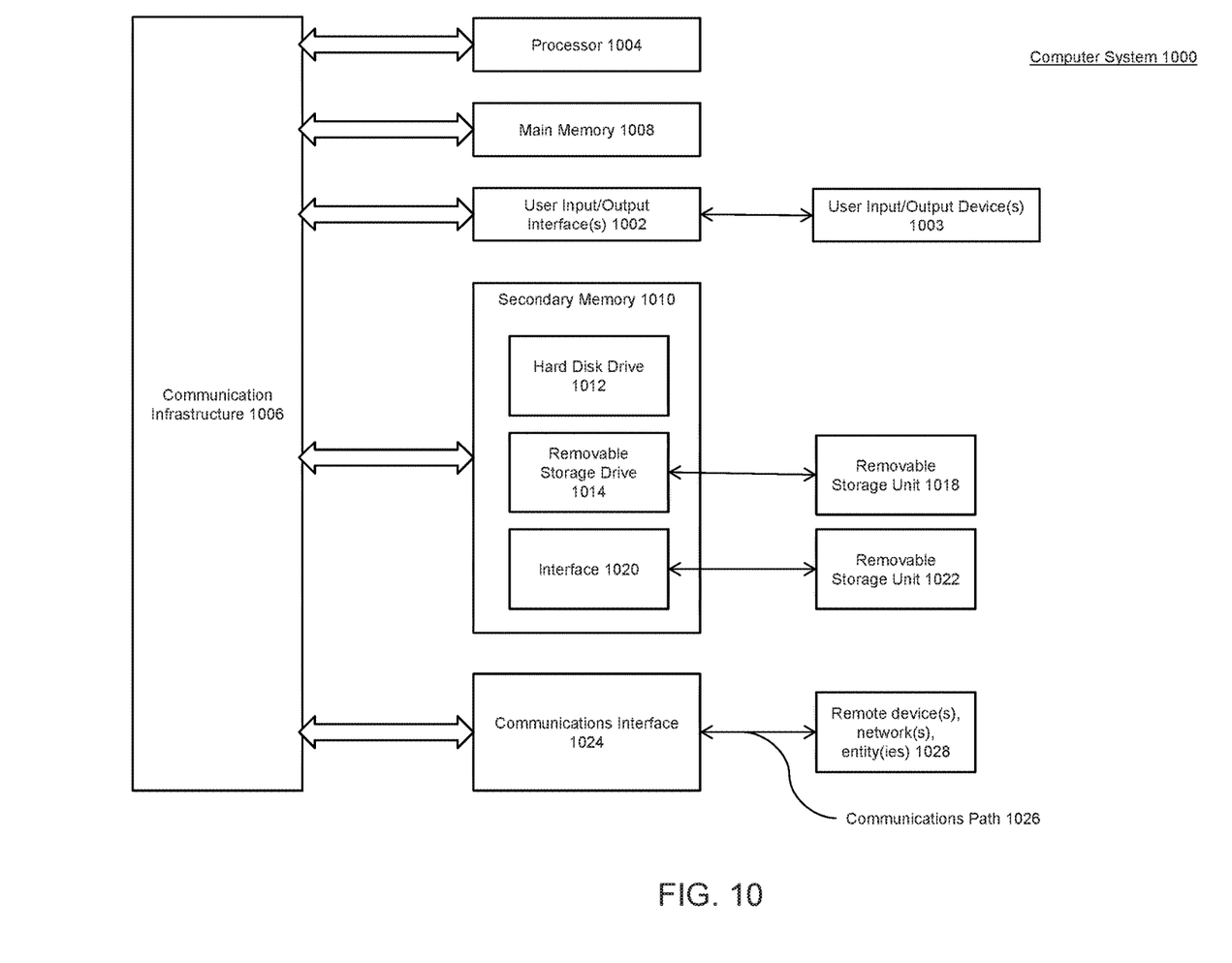
FIG. 10 is an example computer system useful for implementing various embodiments.

Various embodiments can be implemented, for example, using one or more computer systems, such as computer system 1000 shown in FIG. 10. Computer system 1000 can be used, for example, to implement method 600 of FIG. 6, 700 of FIG. 7, 800 of FIG. 8, and 900 of FIG. 9. Furthermore, computer system 1000 can be at least part of server 100 as shown in FIG. 1. For example, computer system 1000 can identify an attribute associated with unstructured data files using a machine-learning model. Computer system 1000 can be any computer capable of performing the functions described herein.

Computer system 1000 can be any well-known computer capable of performing the functions described herein.

Computer system 1000 includes one or more processors (also called central processing units, or CPUs), such as a processor 1004. Processor 1004 is connected to a communication infrastructure or bus 1006.

One or more processors 1004 can each be a graphics processing unit (GPU). In an embodiment, a GPU is a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 1000 also includes user input/output device(s) 1003, such as monitors, keyboards, pointing devices, etc., that communicate with communication infrastructure 1006 through user input/output interface(s) 1002.

Computer system 1000 also includes a main or primary memory 1008, such as random access memory (RAM). Main memory 1008 can include one or more levels of cache. Main memory 1008 has stored therein control logic (i.e., computer software) and/or data.

Computer system 1000 can also include one or more secondary storage devices or memory 1010. Secondary memory 1010 can include, for example, a hard disk drive 1012 and/or a removable storage device or drive 1014. Removable storage drive 1014 can be a floppy disk drive, a magnetic tape drive, a compact disk drive, an optical storage device, tape backup device, and/or any other storage device/drive.

Removable storage drive 1014 can interact with a removable storage unit 1018. Removable storage unit 1018 includes a computer usable or readable storage device having stored thereon computer software (control logic) and/or data. Removable storage unit 1018 can be a floppy disk, magnetic tape, compact disk, DVD, optical storage disk, and/any other computer data storage device. Removable storage drive 1014 reads from and/or writes to removable storage unit 1018 in a well-known manner.

According to an exemplary embodiment, secondary memory 1010 can include other means, instrumentalities or other approaches for allowing computer programs and/or other instructions and/or data to be accessed by computer system 1000. Such means, instrumentalities or other approaches can include, for example, a removable storage unit 1022 and an interface 1020. Examples of the removable storage unit 1022 and the interface 1020 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1000 can further include a communication or network interface 1024. Communication interface 1024 enables computer system 1000 to communicate and interact with any combination of remote devices, remote networks, remote entities, etc. (individually and collectively referenced by reference number 1028). For example, communication interface 1024 can allow computer system 1000 to communicate with remote devices 1028 over communications path 1026, which can be wired and/or wireless, and which can include any combination of LANs, WANs, the Internet, etc. Control logic and/or data can be transmitted to and from computer system 1000 via communication path 1026.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 1000, main memory 1008, secondary memory 1010, and removable storage units 1018 and 1022, as well as tangible articles of manufacture embodying any combination of the foregoing. Such control logic, when executed by one or more data processing devices (such as computer system 1000), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 10. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method comprising:
receiving, by one or more computing devices, a request to identify an attribute associated with a set of unstructured data files;
extracting, by the one or more computing devices, a first and second subset of features from each unstructured data file of the set of unstructured data files;
training, by the one or more computing devices, a machine-learning model using the first and second subset of features from each unstructured data file of the set of unstructured data files;
generating, by the one or more computing devices, a word embedding for each unstructured data file in the set of unstructured data files based on the first subset of features of each unstructured data file of the set of unstructured data files, using the machine-learning model;
generating, by the one or more computing devices, a numerical lookup table for each unstructured data file in the set of unstructured data files based on the second subset of features of each unstructured data file of the set of unstructured data files, using the machine-learning model; and
identifying, by the one or more computing devices, the attribute in the set of unstructured data files based on each of the word embeddings and numerical lookup tables using the machine-learning model.

2. The method of claim 1, wherein each of the unstructured data files in the set of unstructured data files is a scanned image file.

3. The method of claim 1, further comprising executing, by the one or more computing devices, an optical character recognition algorithm on each unstructured data file of the set of unstructured data files to convert alphanumeric text in each unstructured data file into machine-encoded text.

4. The method of claim 1, wherein the first subset of features for each unstructured data file of the set of unstructured data files includes text extracted from a respective unstructured data file.

5. The method of claim 1, wherein the second subset of features for each unstructured data file of the set of unstructured data files includes numerical values extracted from a respective unstructured data file.

6. The method of claim 1, further comprising combining, by the one or more computing devices, the word embeddings of each unstructured data file of the set of unstructured data files.

7. The method of claim 1, wherein the attribute is identified based on the numerical lookup table for each unstructured data file of the unstructured data files.

8. A system comprising:
a memory; and
at least one processor coupled to the memory and configured to:
receive a request to identify an attribute associated with a set of unstructured data files;
extract a first and second subset of features from each unstructured data file of the set of unstructured data files;
train a machine-learning model using the first and second subset of features from each unstructured data file of the set of unstructured data files;
generate a word embedding for each unstructured data file in the set of unstructured data files based on the first subset of features of each unstructured data file of the set of unstructured data files, using the machine-learning model;
generate a numerical lookup table for each unstructured data file in the set of unstructured data files based on the second subset of features of each unstructured data file of the set of unstructured data files, using the machine-learning model; and
identify the attribute in the set of unstructured data files based on each of the word embeddings and numerical lookup tables using the machine-learning model.

9. The system of claim 8, wherein each of the unstructured data files in the set of unstructured data files is a scanned image file.

10. The system of claim 8, wherein the processor is further configured to execute an optical character recognition algorithm on each unstructured data file of the set of unstructured data files to convert alphanumeric text in each unstructured data file into machine-encoded text.

11. The system of claim 8, wherein the first subset of features for each unstructured data file of the set of unstructured data files includes text extracted from a respective unstructured data file.

12. The system of claim 8, wherein the second subset of features for each unstructured data file of the set of unstructured data files includes numerical values extracted from a respective unstructured data file.

13. The system of claim 8, wherein the processor is further configured to combine the word embeddings of each unstructured data file of the set of unstructured data files.

14. The system of claim 8, wherein the attribute is identified based on the numerical lookup table for each unstructured data file of the unstructured data files.

15. A non-transitory computer-readable device having instructions stored thereon that, when executed by at least one computing device, cause the at least one computing device to perform operations comprising:
training a machine-learning model using a first and second subset of features extracted from each unstructured data file of the set of unstructured data files;
generating a word embedding for each unstructured data file in the set of unstructured data files based on the first subset of features of each unstructured data file of the set of unstructured data files, using the machine-learning model;
generating a numerical lookup table for each unstructured data file in the set of unstructured data files based on the second subset of features of each unstructured data file of the set of unstructured data files, using the machine-learning model; and
identifying an attribute in the set of unstructured data files based on each of the word embeddings and numerical lookup tables using the machine-learning model.

16. The non-transitory computer-readable medium of claim 15, wherein each of the unstructured data files in the set of unstructured data files is a scanned image file.

17. The non-transitory computer-readable medium of claim 15, wherein the first subset of features for each unstructured data file of the set of unstructured data files includes text extracted from a respective unstructured data file.

18. The non-transitory computer-readable medium of claim 15, wherein the second subset of features for each unstructured data file of the set of unstructured data files includes numerical values extracted from a respective unstructured data file.

19. The non-transitory computer-readable medium of claim 15, the operations further comprising combining the word embeddings of each unstructured data file of the set of unstructured data files.

20. The non-transitory computer-readable medium of claim 15, wherein the attribute is identified based on the numerical lookup table for each unstructured data file of the unstructured data files.

* * * * *